United States Patent
Park et al.

(10) Patent No.: US 8,876,358 B2
(45) Date of Patent: Nov. 4, 2014

(54) DISPLAY APPARATUS

(75) Inventors: SangRyeon Park, Gumi-si (KR); Eun-Yup Lee, Chungcheongnam-do (KR); HyunSeok Lee, Suwon-si (KR); Chulyoun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 364 days.

(21) Appl. No.: 13/338,687

(22) Filed: Dec. 28, 2011

(65) Prior Publication Data

US 2012/0262855 A1 Oct. 18, 2012

(30) Foreign Application Priority Data

Apr. 18, 2011 (KR) .................. 10-2011-0035880

(51) Int. Cl.
*F21V 7/04* (2006.01)
*G02F 1/1333* (2006.01)

(52) U.S. Cl.
CPC .............. *G02F 1/133308* (2013.01); *G02F 2001/133317* (2013.01); *G02F 2001/133322* (2013.01); *G02F 2202/28* (2013.01)
USPC .............. 362/633; 362/634; 362/561; 349/58

(58) Field of Classification Search
CPC . G02F 1/13357; G02F 1/1333; G02F 1/1335; H05K 7/14; F21V 7/10; F21V 7/04
USPC ............ 362/33, 97.1–97.4, 240–248, 249.01, 362/249.02, 249.11, 326, 327, 328, 555, 362/561, 606–615, 632–634, 800, 812; 349/8, 61–65, 69, 70; 40/541, 546, 40/548, 549, 563, 564, 570, 591–594; 361/679.24, 807

See application file for complete search history.

(56) References Cited

U.S. PATENT DOCUMENTS

| 6,419,369 | B1 * | 7/2002 | Itoh ............................... 362/26 |
| 7,083,318 | B2 * | 8/2006 | Ha et al. ...................... 362/633 |
| 7,507,013 | B2 * | 3/2009 | Shimizu et al. .............. 362/633 |
| 8,026,995 | B2 * | 9/2011 | Won et al. ...................... 349/58 |

(Continued)

FOREIGN PATENT DOCUMENTS

| CN | 1690802 A | 11/2005 |
| CN | 101939585 A | 1/2011 |

OTHER PUBLICATIONS

Office Action dated Apr. 3, 2014 from The State Intellectual Property Office of the People's Republic of China in counterpart Chinese application No. 201110461253.5.

*Primary Examiner* — Hargobind S Sawhney
(74) *Attorney, Agent, or Firm* — Morgan, Lewis & Bockius LLP

(57) ABSTRACT

Disclosed is a display apparatus which does not use some elements of cases and set cover members necessary for producing the display apparatus and thus can minimize a thickness and enhance a sense of beauty with an innovative design. The display apparatus includes a display panel, a panel supporting member, an adhesive member, a guide frame, and a cover member. The panel supporting member supports a rear edge of the display panel. The adhesive member is disposed at one side of the panel supporting member, and couples the display panel and the panel supporting member. The guide frame supports the panel supporting member. The cover member is disposed to overlap with the other side of the panel supporting member and surround a side surface of the guide frame, thereby enabling movement of the panel supporting member.

22 Claims, 12 Drawing Sheets

(56) References Cited

U.S. PATENT DOCUMENTS

| | | | |
|---|---|---|---|
| 8,587,746 B2 * | 11/2013 | Kim et al. | 349/61 |
| 8,610,842 B2 * | 12/2013 | Kim et al. | 349/58 |
| 8,633,405 B2 * | 1/2014 | Shin et al. | 174/535 |
| 2007/0252922 A1 * | 11/2007 | Oohira | 349/58 |
| 2010/0165237 A1 * | 7/2010 | Jung | 349/58 |
| 2010/0201906 A1 * | 8/2010 | Fukayama et al. | 349/58 |
| 2011/0069255 A1 * | 3/2011 | Choi et al. | 349/63 |
| 2011/0085107 A1 * | 4/2011 | Noh et al. | 349/61 |
| 2011/0090422 A1 | 4/2011 | Hamada | |
| 2011/0090426 A1 * | 4/2011 | Choi et al. | 349/65 |

* cited by examiner

DISPLAY APPARATUS

CROSS-REFERENCE TO RELATED APPLICATIONS

This application claims the benefit of the Korean Patent Application No. 10-2011-0035880 filed on Apr. 18, 2011, which is hereby incorporated by reference as if fully set forth herein.

BACKGROUND

1. Field of the Invention

The present invention relates to a display device, and more particularly, to a display device which does not use some elements of cases and set cover members necessary for producing the display device and thus can minimize a thickness and enhance a sense of beauty with an innovative design.

2. Discussion of the Related Art

Recently, flat panel display devices that can decrease a weight and a volume corresponding to the limitations of Cathode Ray Tubes (CRTs) are being developed. Liquid Crystal Display (LCD), Plasma Display Panels (PDPs), Field Emission Display (FED), and light emitting display are actively being researched as flat type display apparatuses. However, among such flat panel display apparatuses, Liquid Crystal Display are easily manufactured, have good drivability of drivers, realize a high-quality image, and thus are attracting much attention.

In terms of technology and design interesting to consumers, recently, research and development of flat panel display apparatuses are increasingly required. Therefore, efforts are being continuously made for minimizing (slimming) the thicknesses of display apparatuses, and research is increasingly conducted on a design with enhanced sense of beauty that can induce consumers to buy by appealing to the consumers' sense of beauty.

However, in design development for enhancing a scene of beauty or slimming of display apparatuses that have been made to date, elements configuring a related art display apparatus have been applied as is, and the structures of the elements have been changed. Due to these reasons, there are limitations in slimming display devices and developing the new designs of the display apparatuses.

For example, in LCD of the related art, a lower case and a front case are necessarily used for receiving a liquid crystal display panel and a backlight unit, and moreover, a separate front set cover and rear set cover are additionally used for applying the LCD to notebook computers, monitors, mobile devices, televisions, etc. As described above, display apparatuses of the related art necessarily use the front set cover and rear set cover as well as the lower case and front case, and consequently, there are limitations in reducing the thicknesses of LCD or changing the designs thereof. Particularly, the front set cover and rear set cover necessarily cover a top edge of a liquid crystal display panel. Due to this reason, the thicknesses of LCD inevitably become thicker, and moreover, the border widths of the LCD enlarge. In addition, it is difficult to realize various innovative designs due to a step height in a border portion.

SUMMARY

Accordingly, the present invention is directed to provide a display apparatus that substantially obviate one or more problems due to limitations and disadvantages of the related art.

An aspect of the present invention is directed to provide a display apparatus which does not use some elements of cases and set cover members necessary for producing the display apparatus and thus can minimize a thickness and enhance a sense of beauty with an innovative design.

Another aspect of the present invention is directed to provide a display apparatus which can prevent light leakage due to the non-movement of a display panel that is caused by removing some elements of cases and set cover members.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display apparatus including: a display panel; a panel supporting member supporting a rear edge of the display panel; an adhesive member disposed at one side of the panel supporting member, and coupling the display panel and the panel supporting member; a guide frame supporting the panel supporting member; and a cover member disposed to overlap with the other side of the panel supporting member and surround a side surface of the guide frame, thereby enabling movement of the panel supporting member.

The panel supporting member may be movable in at least one of X-axis, Y-axis, and Z-axis directions, between the guide frame and the cover member.

A top and side surface of the display panel may be exposed to the outside without being surrounded by the guide frame and the cover member.

The cover member may include: a front portion overlapping with an adhesive member forming part which is prepared at the other side of the panel supporting member; and a side portion bent from the front portion, and surrounding a side surface of the panel supporting member and the side surface of the guide frame.

The panel supporting member may be movable in a Z-axis direction by an upper gap having a certain height which is prepared between the other side of the panel supporting member and the front portion of the cover member, and be movable in at least one of X-axis and Y-axis directions by a side gap having a certain width which is prepared between the side surface of the panel supporting member and the side portion of the cover member.

The cover member may be formed in a tetragonal frame shape to have a ㄱ-shaped sectional surface by the front portion and the side portion.

The display apparatus may further include: a supporting cover supporting the guide panel; and a coupling member coupling the cover member to the supporting cover.

The display apparatus may further include a backlight unit placed in the supporting cover, and irradiate light on the display panel.

The cover member may further include a rear portion which is bent from the side portion to face a rear surface of the supporting cover, and the coupling member may be coupled to the supporting cover through the rear portion to fix the cover member.

The display apparatus may further include a set cover supporting the supporting cover, and surrounding the side portion of the cover member and a side surface of the display panel other than a front surface of the display panel.

The display panel may be disposed to overlap with the front portion of the cover member, and the front portion of the cover member may be inserted into a space between the panel supporting member and the display panel, for the upper gap to be prepared therein.

The display apparatus may further include a set cover supporting the supporting cover, and surround the side portion of the cover member and a side surface of the display panel other than a front surface of the display panel.

The panel supporting member may be formed in a tetragonal frame shape to include an adhesive member forming part with the adhesive member formed therein and a cover overlapping part overlapping with the cover member.

The panel supporting member may further include a plurality of slits which are disposed at certain intervals at the adhesive member forming part with the adhesive member formed therein.

The panel supporting member may include first to fourth supporting brackets which are formed to include an adhesive member forming part with the adhesive member formed therein and a cover overlapping part overlapping with the cover member, coupled to respective edge portions of long sides and short sides of the display panel by the adhesive member, and supported by the guide frame.

The panel supporting member may further include a plurality of slits which are formed at certain intervals at the adhesive member forming part of each of the first to fourth supporting brackets, the adhesive member being formed at the adhesive member forming part.

The panel supporting member may include first to fourth supporting brackets which are formed to include an adhesive member forming part with the adhesive member formed therein and a cover overlapping part overlapping with the cover member, coupled to respective rear edge portions of the display panel at certain intervals by the adhesive member, and supported by the guide frame.

The display apparatus may further include a plurality of pads disposed at the guide frame in correspondence with respective gaps between the supporting brackets to seal the respective gaps between the supporting brackets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display apparatus according to embodiments of the present invention will be described in detail with reference to the accompanying drawings.

Figure 1:
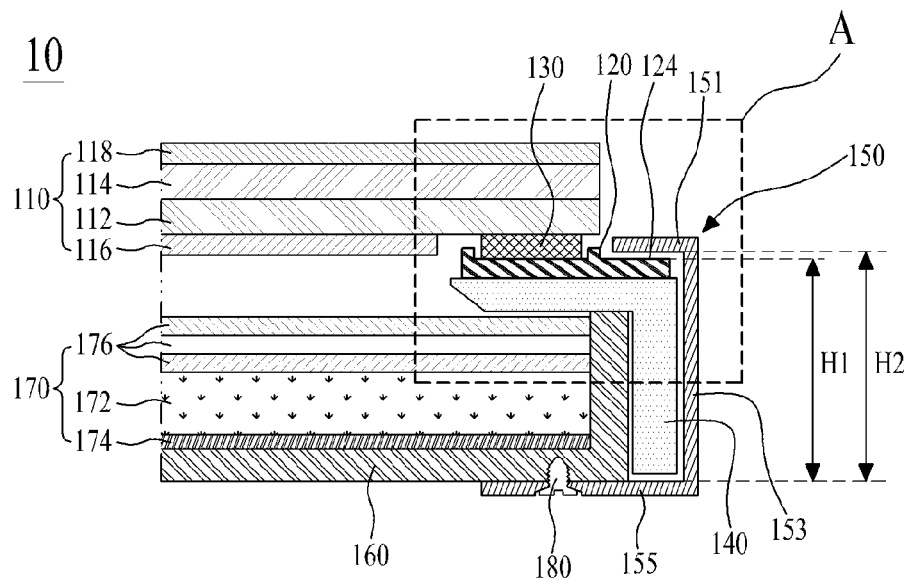
FIG. 1 is a view schematically illustrating a display apparatus according to a first embodiment of the present invention.
Figure 2:
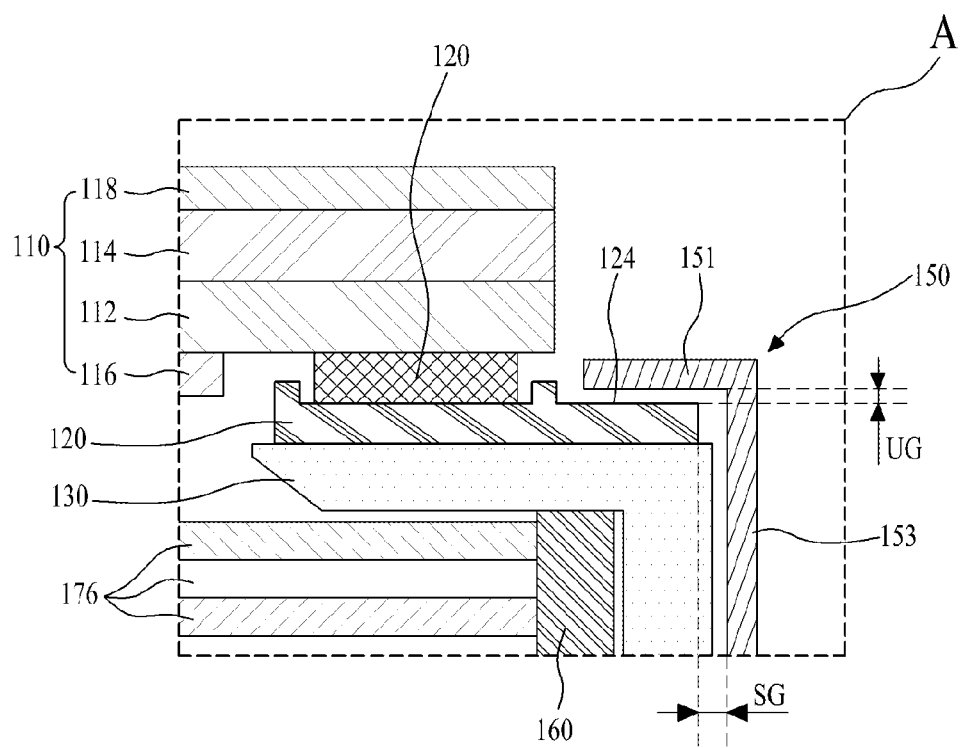
FIG. 2 is an enlarged view of a portion A of FIG. 1.

FIG. 1 is a view schematically illustrating a display apparatus according to a first embodiment of the present invention. FIG. 2 is an enlarged view of a portion A of FIG. 1.

Referring to FIGS. 1 and 2, a display apparatus 10 according to the first embodiment of the present invention includes a display panel 110, a panel supporting member 120 that supports a rear edge of the display panel 110, an adhesive member 130 that is formed at one side of the panel supporting member 120 and couples the display panel 110 and the panel supporting member 120, a guide frame 140 that supports the panel supporting member 120, and a cover member 150 that surrounds a top of the other side of the panel supporting member 120 and a side surface of the guide frame 140 so as to enable the movement of the panel supporting member 120.

The display panel 110 may be a liquid crystal display panel or an organic light emitting display panel that includes a facing-coupled lower substrate 112 and upper substrate 114.

In an embodiment, when the display panel 110 is the liquid crystal display panel, the display panel 110 may further include the lower substrate 112 and upper substrate 114 that are facing-coupled to each other with a liquid crystal layer (not shown) therebetween, a lower polarizer 116 adhered to the lower substrate 112, and an upper polarizer 118 adhered to entire one surface of the upper substrate 114.

In another embodiment, when the display panel 110 is the organic light emitting display panel, the display panel 110 includes the facing-coupled lower substrate 112 and upper substrate 114, and depending on the case, the display panel 110 may further include the upper polarizer 118 adhered to entire one surface of the upper substrate 114.

The display panel 110 may further include a plurality of circuit films (not shown) adhered to the lower substrate 112, and a Printed Circuit Board (PCB) adhered to the circuit films. Herein, the circuit films may be adhered to the lower substrate 112 and the PCB 350 by a Tape Automated Bonding (TAB) process, and may be a Tape Carrier Package (TCP) or Chip On Flexible Board/Chip On Film (COF).

The panel supporting member 120 supports a rear edge portion of the display panel 110. The panel supporting member 120 is coupled to the rear edge portion of the display panel 110 by the adhesive member 130 and movably disposed at the guide frame 140.

Figure 3:
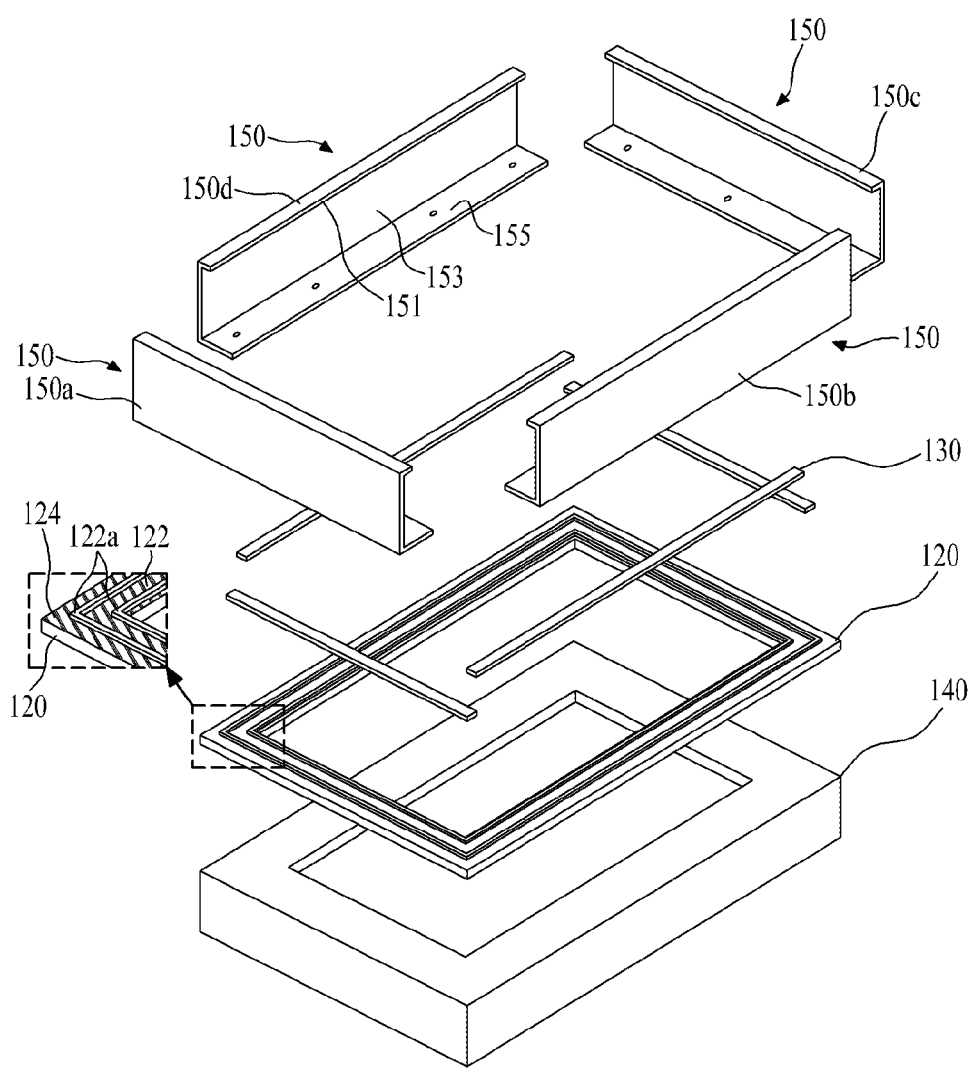
FIG. 3 is a view for describing a guide frame, panel supporting member, adhesive member, and cover member of FIG. 1.

A panel supporting member 120 according to a first embodiment, as illustrated in FIG. 3, is formed in a tetragonal frame shape to have a "-"-shaped sectional surface and supports the rear edge portion of the display panel 110. For this end, the panel supporting member 120 includes an adhesive member forming part 122 with the adhesive member 130 formed therein, and a cover overlapping part 124 overlapping with the cover member 150.

The adhesive member forming part 122 is prepared at a pair of adhesive member guide parts 122a that are formed to be separated from each other. The pair of adhesive member guide parts 122a are parallelly formed to be separated from each other with the adhesive member forming part 122 therebetween, at one side of the panel supporting member 120. In this case, the adhesive member guide parts 122a are formed to have a height greater than that of the adhesive member 130 that is formed at the adhesive member forming part 122.

The cover overlapping part 124 is formed to have "-"-shaped sectional surface and a certain length, at the other side 124 of the panel supporting member 120.

Figure 4:
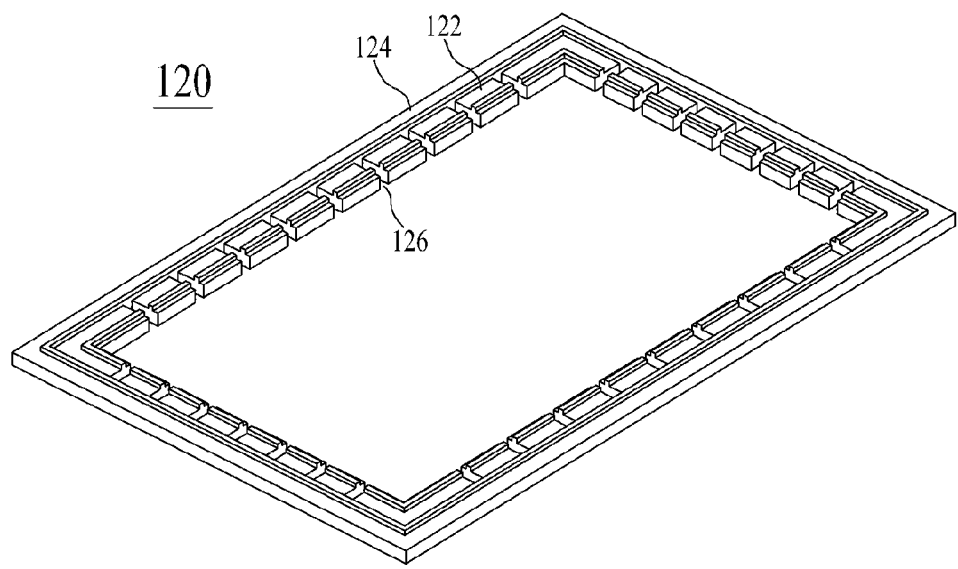
FIG. 4 is a view for describing another embodiment of the panel supporting member of FIG. 3 according to a first embodiment of the present invention.

The panel supporting member 120 according to the first embodiment, as illustrated in FIG. 4, may further include a plurality of slits 126 that are formed at certain intervals, at the adhesive member forming part 122.

The slits 126 divide the adhesive member forming part 122 at certain intervals. Therefore, a plurality of adhesive member forming parts 122 divided by the slits 126 have a certain elastic force and thus move in a Z-axis direction.

Figure 5:
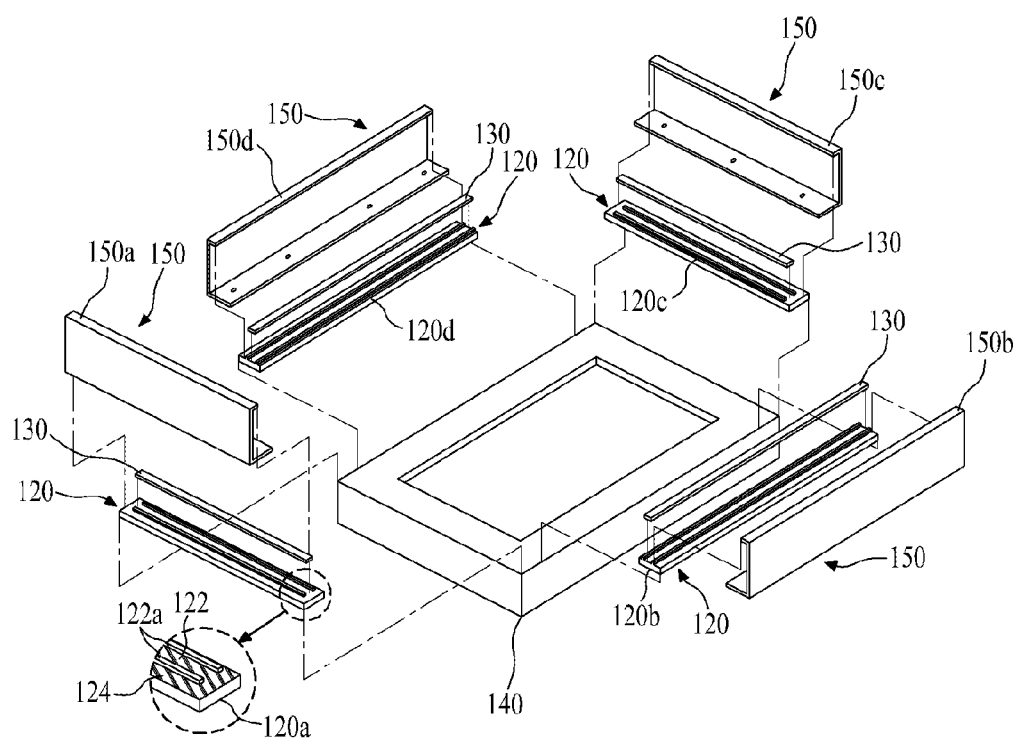
FIG. 5 is a view for describing a panel supporting member of FIG. 1 according to a second embodiment of the present invention.

A panel supporting member 120 according to a second embodiment, as illustrated in FIG. 5, includes first to fourth supporting brackets 120a to 120d that support the rear edge portions of respective long sides and short sides of the display panel 110.

Each of the first to fourth supporting brackets 120a to 120d is formed in a stripe shape to have a "-"-shaped sectional surface and disposed at the guide frame 140. Therefore, each of the first to fourth supporting brackets 120a to 120d disposed at the guide frame 140 has a tetragonal frame shape. Identically the panel supporting member 120 according to the first embodiment, each of the first to fourth supporting brackets 120a to 120d includes the adhesive member forming part 122 with the adhesive member 130 formed therein, and the cover overlapping part 124 overlapping with the cover member 150.

Figure 6:
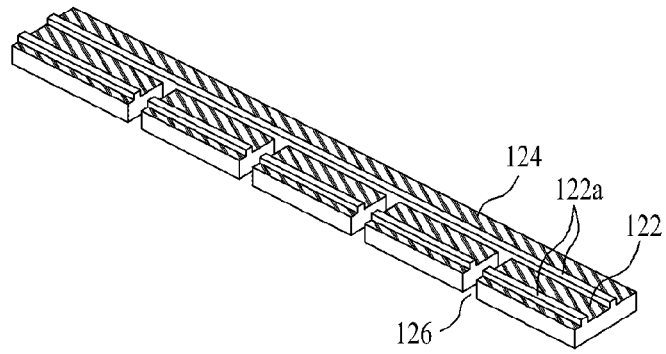
FIG. 6 is a view for describing another embodiment of the panel supporting member of FIG. 5 according to the second embodiment of the present invention.

The panel supporting member 120 according to the second embodiment, as illustrated in FIG. 6, may further include a plurality of slits 126 that are formed at certain intervals, at the adhesive member forming part 122 of each of the first to fourth supporting brackets 120a to 120d.

The slits 126 divide the adhesive member forming part 122 of each of the first to fourth supporting brackets 120a to 120d at certain intervals. Therefore, the adhesive member forming parts 122 of each of the first to fourth supporting brackets 120a to 120d divided by the slits 126 have a certain elastic force and thus move in a Z-axis direction.

Figure 7:
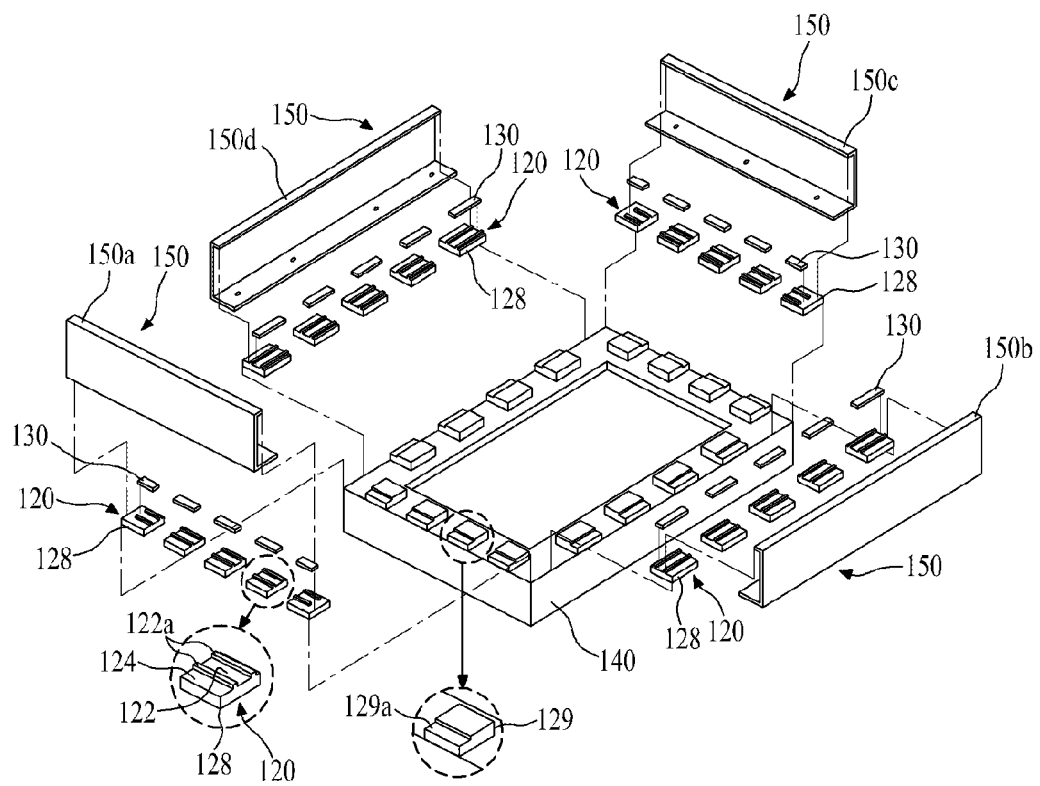
FIGS. 7 and 8 are views for describing a panel supporting member of FIG. 1 according to a third embodiment of the present invention.

A panel supporting member 120 according to a third embodiment, as illustrated in FIG. 7, includes a plurality of supporting brackets 128 that partially support the rear edge portions of respective long sides and short sides of the display panel 110.

Each of the supporting brackets 128 is formed to have a "-"-shaped sectional surface and a certain length and disposed at the guide frame 140 at certain intervals. Identically the panel supporting member 120 according to the first embodiment, each of the supporting brackets 128 includes the adhesive member forming part 122 with the adhesive member 130 formed therein, and the cover overlapping part 124 overlapping with the cover member 150.

When the display panel 110 is a liquid crystal display panel, in performing the high temperature deformation of the display panel 110, light leakage such as the spot of the display panel 110 occurs by the direct contact of the display panel 110 and both side ends of each of the supporting brackets 128, and the degree of deformation of the display panel 110 that is concentrated on both side ends of each of the supporting brackets 128. To prevent such limitations, as illustrated in FIG. 9, each supporting bracket 128 of FIG. 7 may further include a plurality of corner cutting parts 127a that are respectively formed at both side ends of each of the pair of adhesive member guide parts 122a.

The corner cutting part 127a is concavely formed to have a certain slope or a curvature in a length direction of each of the pair of adhesive member guide parts 122a, at both side ends (border portion) of each of the adhesive member guide part 122a. The corner cutting part 127a may be formed by a chamfer process or a rounding process. The corner cutting part 127a forms a certain gap between the display panel 110 and both side ends of the supporting bracket 128 when the display panel 110 and the supporting bracket 128 are deformed by the high temperature deformation of the display panel 110, and thus prevents both side ends of the supporting bracket 128 from contacting the display panel 110, thereby preventing light leakage such as the spot of the display panel 110.

Figure 9:
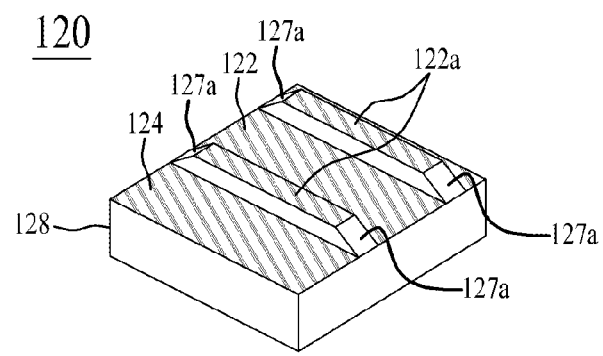
FIGS. 9 to 11 are views for describing modification embodiments of a supporting bracket of FIG. 7.
Figure 10:
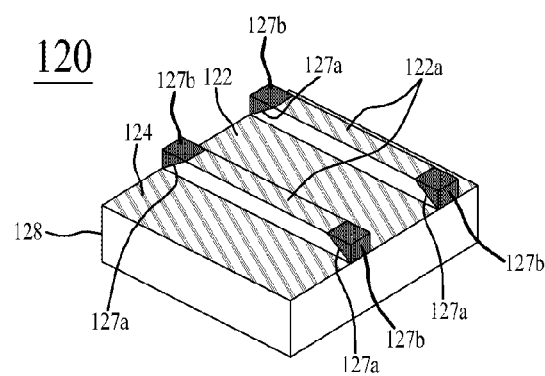

Each supporting bracket 128 of FIG. 9, as illustrated in FIG. 10, may further include a pad member 127b that is formed at each of the corner cutting parts 127a.

The pad member 127b is formed at a corner cutting part 167 and forms corner portions of both side ends of each of the adhesive member guide parts 122a. The pad member 127b is formed of a material different from that of the adhesive member guide part 122a, for example, may be formed of a soft material such as rubber, urethane, elastomer, or silicon. The pad member 127b may be simultaneously formed together with the adhesive member guide part 122a, in a double injection process or an insert injection process. Since the pad member 127b is formed of a soft material, the pad member 127b is deformed by the contact of the display panel 110 in performing the high temperature deformation of the display panel 110, and thus, a stress is prevented from being concentrated on the display panel 110 by both side ends (side surface corner portions) of each of the supporting bracket 128, thereby preventing light leakage such as the spot of the display panel 110.

Figure 11:
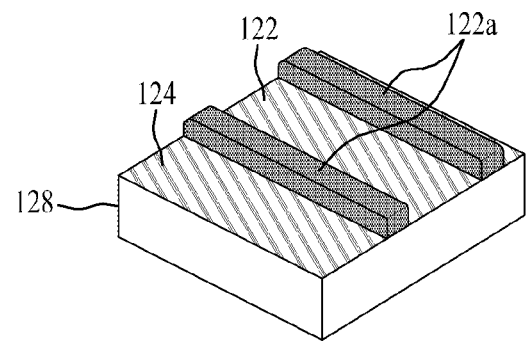

On the other hand, as illustrated in FIG. 11, the adhesive member guide parts 122a of each supporting bracket 128 of FIG. 7 may be formed of a soft material, for example, rubber, urethane, elastomer, or silicon. The adhesive member guide parts 122a formed of a soft material may be simultaneously formed together with the supporting bracket 128, in the double injection process or the insert injection process. Each of the adhesive member guide parts 122a formed of a soft material defines a position for forming the adhesive member forming part 122 and thus facilitates a process of forming the adhesive member 130. Also, each of the adhesive member guide parts 122a formed of a soft material is deformed by the contact of the display panel 110 in performing the high temperature deformation of the display panel 110, and thus, a stress is prevented from being concentrated on the display panel 110, thereby preventing light leakage such as the spot of the display panel 110.

Figure 8:
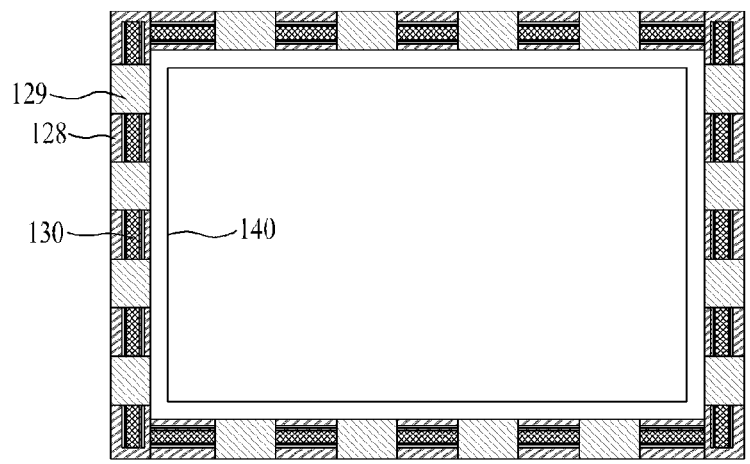

Referring again to FIGS. 7 and 8, when the display panel 110 is the liquid crystal display panel, light leakage occurs in a space between the supporting brackets 128 that are disposed at the guide frame 140 at certain intervals. Therefore, the display apparatus 10 according to the first embodiment may further include a plurality of pads 129 that are formed at the guide frame 140 in correspondence with respective gaps between the supporting brackets 128, and seal the respective gaps between the supporting brackets 128.

One side of each of the pads 129 contacts a rear surface of the display panel 110. The other side of each of the pads 129 is formed to have the same height as that of the cover overlapping part 124 of each supporting bracket 128 so as to overlap with the cover member 150.

Referring to FIGS. 1 and 2, the adhesive member 130 is formed at the adhesive member forming part 122 of the panel supporting member 120 and couples the display panel 110 and the panel supporting member 120. In this case, as illustrated in FIG. 3, 5 or 7, the adhesive member 130 may be formed in correspondence with a length of each of the short side and long side of the display panel 110, or formed to have a certain length according to the structure of the panel supporting member 120. That is, the adhesive member 130 is formed at the adhesive member forming part 122 of the panel supporting member 120 according to any one of the above-described first to third embodiments of FIGS. 3 to 7. The adhesive member 130 may be a double-sided tape adhered to the adhesive member forming part 122, or an adhesive (for example, a thermosetting adhesive, or a photocurable adhesive) coated on the adhesive member forming part 122.

The guide frame 140 is formed in a tetragonal frame shape to include a disposing part that supports the panel supporting member 120 and a vertical portion that is bent vertically from the disposing part, and supports the panel supporting member 120. That is, the guide frame 140 is formed to have a ㄱ-shaped sectional shape, and supports the panel supporting member 120 with the disposing part.

The display apparatus 10 according to the first embodiment may further include a supporting cover 160 for supporting the guide frame 140.

The supporting cover 160 is formed in a U-shape to have a receiving space, and supports the disposing part of the guide frame 140. Herein, when the display panel 110 is the liquid crystal display panel, a backlight unit 170 for irradiating light on the display panel 110 is placed in the receiving space of the supporting cover 160.

The backlight unit 170, as illustrated in FIG. 1, includes a light guide panel 172, a reflective sheet 174, and an optical member 176.

The light guide panel 172 is formed in a flat type (or a wedge type) to have a light incident surface, and guides light, inputted from a light source (not shown) through the light incident surface, to the display panel 110. Herein, the light source may include a fluorescent lamp or a Light Emitting Diode (LED).

The reflective sheet 174 is disposed at a rear surface of the light guide panel 172 and reflects light, inputted from the light guide panel 172, to the display panel 110.

The optical member 176 is disposed on the light guide panel 172 and enhances the luminance characteristic of light traveling from the light guide panel 172 to the display panel 110. For this end, the optical member 176 may include at least two of a lower diffusive sheet, a lower prism sheet, an upper prism sheet, and an upper diffusive sheet.

The cover member 150 is disposed to surround the top of the other side of the panel supporting member 120, a side surface of the guide frame 140, and a rear surface of the supporting cover 160 so as to enable the movement of the panel supporting member 120 coupled to the display panel 110. Therefore, a top and side surface of the display panel 110 are exposed to the outside without being surrounded by the guide frame 140 and the cover member 150. That is, in the display apparatus 10 according to the first embodiment, the display panel 110 is coupled to the panel supporting member 120 by the adhesive member 130, the panel supporting member 120 coupled to the display panel 110 is disposed at the guide frame 140, and then the cover member 150 movably surrounds the panel supporting member 120, thus removing the existing upper case that surrounds a front edge portion of the display panel 110.

The cover member 150, as illustrated in FIGS. 1 to 3, includes first to fourth cover brackets 150a to 150d that overlap with respective cover overlapping parts 124 of the panel supporting member 120 that is disposed at respective edge portions of the short sides and long sides of the guide frame 140 and surround the side surface of the guide frame 140.

Each of the first to fourth cover brackets 150a to 150d includes a front portion 151, a side portion 153, and a rear portion 155.

The front portion 151 is formed in a "-"-shape to overlap with the cover overlapping part 124 of the panel supporting part 120. In this case, an upper gap UG (see FIG. 2) having a certain height is prepared between the front portion 151 and the cover overlapping portion 124 of the panel supporting member 120 coupled to the display panel 110. Herein, the upper gap UG may be less than about 1.5 mm. Therefore, the panel supporting member 120 coupled to the display panel 110 moves in at least one of Y-axis and Z-axis directions, inside the upper gap UG.

The side portion 153 is bent vertically from the front portion 151 and surrounds the side surface of the panel supporting member 120 and the side surface of the guide frame 140. In this case, a height of the side portion 153 is formed higher than a height from the rear surface of the supporting cover 160 to a top of the cover overlapping part 124 of the panel supporting member 120 such that the upper gap UG is prepared between the cover overlapping part 124 of the panel supporting member 120 and the front portion 151. That is, the height (H2=H1+UG) of the side portion 153 is formed higher by the upper gap UG than an entire height H1 of the supporting cover 160 and panel supporting member 120. Furthermore, a side gap SG having a certain width (see FIG. 2) is prepared between a side surface of the side portion 153 and a side surface of the panel supporting member 120. Therefore, the panel supporting member 120 coupled to the display panel 110 moves in an X-axis direction and/or a Z-axis direction, inside the side gap SG.

The rear portion 155 is bent from the side portion 153 to face the rear surface of the supporting cover 160. The rear portion 155 is fixed to the supporting cover 160 by a coupling member 180 that is coupled to a bottom of the supporting cover 160 by the rear portion 155.

The rear portion 155 is fixed to the rear surface of the supporting cover 160 by the coupling member 180, and thus, the cover member 150 is disposed to surround the side surface of the panel supporting member 120 and the side surface of the guide frame 140 through the side portion 153 and surround the cover overlapping part 124 of the panel supporting member 120 through the front portion 151. Therefore, the panel supporting member 120 coupled to the display panel 110 may move in at least one of X-axis, Y-axis, and Z-axis directions, inside the upper gap UG and the side gap SG that are respectively prepared by the front portion 151 and side portion 153 of the cover member 150.

In the display apparatus 10 according to the first embodiment, the display panel 110 is coupled to the panel supporting member 120 by the adhesive member 130, and then the panel supporting member 120 coupled to the display panel 110 is disposed at the guide frame 140, thus removing the existing upper case. In this case, the display panel 110 may be directly coupled to the guide frame 140 by the adhesive member 130 instead of the panel supporting member 120. However, when the display panel 110 is the liquid crystal display panel, since the display panel 110 is fixed to the guide frame 140 by the adhesive member 130, a liquid crystal layer is changed because the display panel 110 is pressed by an external force that is applied to the display panel 110 adhered to the adhesive member 130, or the liquid crystal layer is changed by an adhesive strength due to the adhesive member 130, causing light leakage. That is, the light leakage can be regarded as being caused by the non-movement of the display panel 110.

Therefore, in the display apparatus 10 according to the first embodiment of the present invention, the panel supporting member 120 coupled to the display panel 110 moves in the upper gap UG and side gap SG that are prepared by the cover member 150, thus preventing light leakage.

In the display apparatus 10 according to the first embodiment, the display panel 110 is coupled to the panel supporting member 120 by the adhesive member 130, the panel supporting member 120 coupled to the display panel 110 is disposed at the guide frame 140, and then the cover member 150 movably surrounds the panel supporting member 120 coupled to the display panel 110, thereby removing the existing upper. Accordingly, the thickness of the display panel 110 is minimized, and the entire front surface of the display panel 110 is exposed to the outside, thus enhancing a sense of beauty in design. In the display apparatus 10 according to the first embodiment, the upper gap UG and the side gap SG are formed at the upper surface and side surface of the panel supporting member 120 coupled to the display panel 110 by using the cover member 150, and thus enables the movement of the panel supporting member 120, thereby preventing light leakage that is caused by the non-movement of the display panel 110.

Figure 12:
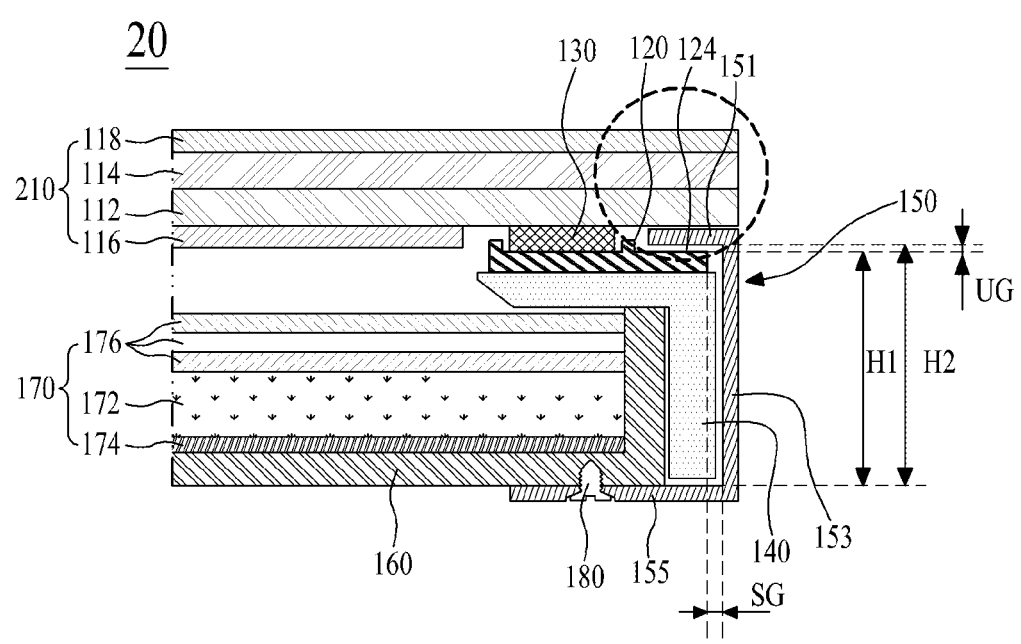
FIG. 12 is a view schematically illustrating a display apparatus according to a second embodiment of the present invention.

FIG. 12 is a view schematically illustrating a display apparatus according to a second embodiment of the present invention.

Referring to FIG. 12, a display apparatus 20 according to the second embodiment of the present invention includes a display panel 210, a panel supporting member 120 that supports a rear edge of the display panel 210, an adhesive member 130 that is formed at one side of the panel supporting member 120 and couples the display panel 210 and the panel supporting member 120, a guide frame 140 that supports the panel supporting member 120, and a cover member 150 that surrounds a top of the other side of the panel supporting member 120 and a side surface of the guide frame 140 so as to enable the movement of the panel supporting member 120. Except for the display panel 210, the display apparatus 20 having such a configuration includes the same elements as those of the display apparatus 10 according to the first embodiment of the present invention, and thus, the description of the display apparatus 10 is applied to the same elements.

The display panel 210, as illustrated in a circular dot line of FIG. 12, is configured identically to the display panel 110 of the display apparatus 10 according to the first embodiment of the present invention, except that the display panel 210 is formed to overlap with a front portion 151 of the cover member 150.

The front portion 151 of the cover member 150 is inserted into a space between a cover overlapping part 124 of the panel supporting member 120 and a lower substrate 112 of the display panel 210, and thus is not exposed to the outside.

In the display apparatus 20 according to the second embodiment of the present invention, the display panel 210 is formed to overlap with the front portion 151 of the cover member 150, and thus can configure a display product such as a television even without a separate element, for example, a set cover. However, in the display apparatus 10 according to the first embodiment of the present invention, since the front portion 151 of the cover member 150 is exposed to the outside, a separate element such as the set cover is required for configuring a display product. Therefore, the display apparatus 10 according to the first embodiment of the present invention may be used as a display module, for example, a liquid crystal display module, but the display apparatus 20 according to the second embodiment of the present invention may be used as a display module or a display product.

The display apparatus 20 according to the second embodiment of the present invention can provide the same effects as those of the display apparatus 10 according to the first embodiment of the present invention. Moreover, in the display apparatus 20 according to the second embodiment of the present invention, the display panel 210 is formed to overlap with the front portion 151 of the cover member 150, thus more enhancing a sense of beauty in design.

Figure 13:
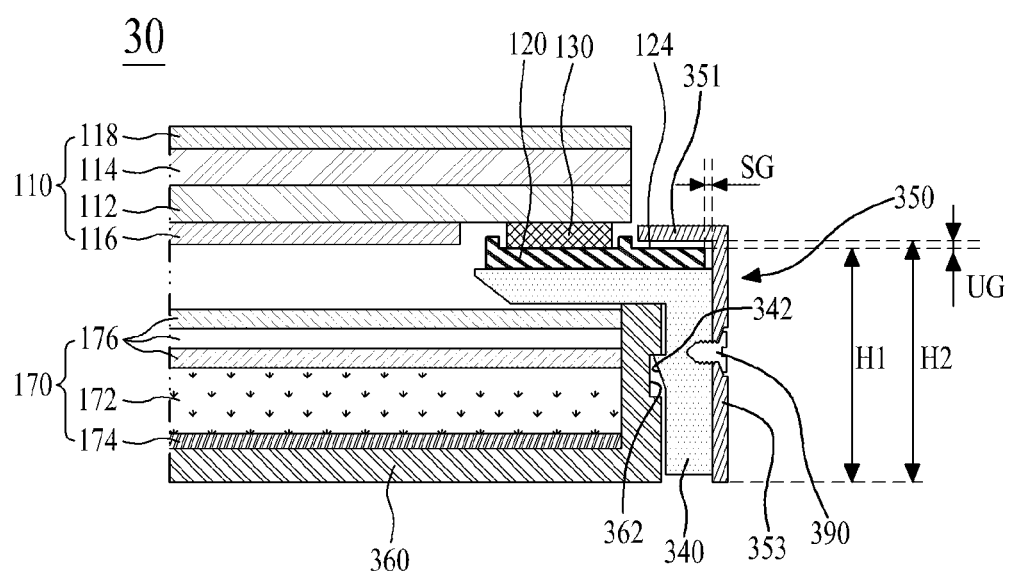
FIG. 13 is a view schematically illustrating a display apparatus according to a third embodiment of the present invention.

FIG. 13 is a view schematically illustrating a display apparatus according to a third embodiment of the present invention.

Referring to FIG. 13, a display apparatus 30 according to the third embodiment of the present invention includes a display panel 110, a panel supporting member 120 that supports a rear edge of the display panel 110, an adhesive member 130 that is formed at one side of the panel supporting member 120 and couples the display panel 110 and the panel supporting member 120, a guide frame 340 that supports the panel supporting member 120, a supporting cover 360 that supports the guide frame 340, and a cover member 350 that surrounds a top of the other side of the panel supporting member 120 and a side surface of the guide frame 340 so as to enable the movement of the panel supporting member 120. Except for the guide frame 340, supporting cover 360, and cover member 350, the display apparatus 30 having such a configuration includes the same elements as those of the display apparatus 10 according to the first embodiment of the present invention, and thus, the description of the display apparatus 10 is applied to the same elements.

The guide frame 340 is formed in a tetragonal frame shape to include a disposing part that supports the panel supporting member 120 and a vertical portion that is bent vertically from the disposing part, and supports the panel supporting member 120. That is, the guide frame 340 is formed to have a ㄱ-shaped sectional shape, and supports the panel supporting member 120 with the disposing part. The guide frame 340 is coupled to the supporting cover 360. For this end, the guide frame 340 includes a first coupling member 342 that is formed at the vertical portion facing the supporting cover 360. The first coupling member 342 is formed to have a stepped portion and an inclined portion from an inner surface of the vertical portion, and coupled to the supporting cover 360.

The supporting cover 360 is formed in a U-shape to have a receiving space, and supports the disposing part of the guide frame 140. Herein, when the display panel 110 is the liquid crystal display panel, a backlight unit 170 for irradiating light on the display panel 110 is placed in the receiving space of the supporting cover 360. The supporting cover 360 includes a second coupling member 362 coupled to the first coupling member 342 that is formed at the guide frame 340. The second coupling member 362 is concavely formed at a supporting side wall that supports the guide frame 340 to bind the stepped portion of the first coupling member 342 formed at the guide frame 340, and thus couples the guide frame 340 and the supporting cover 360.

The cover member 350 is disposed to surround a top of the other side of the panel supporting member 120 and a side surface of the guide frame 340 so as to enable the movement of the panel supporting member 120 coupled to the display panel 110. Therefore, a top and side surface of the display panel 110 are exposed to the outside without being surrounded by the guide frame 340 and the cover member 350.

Figure 14:
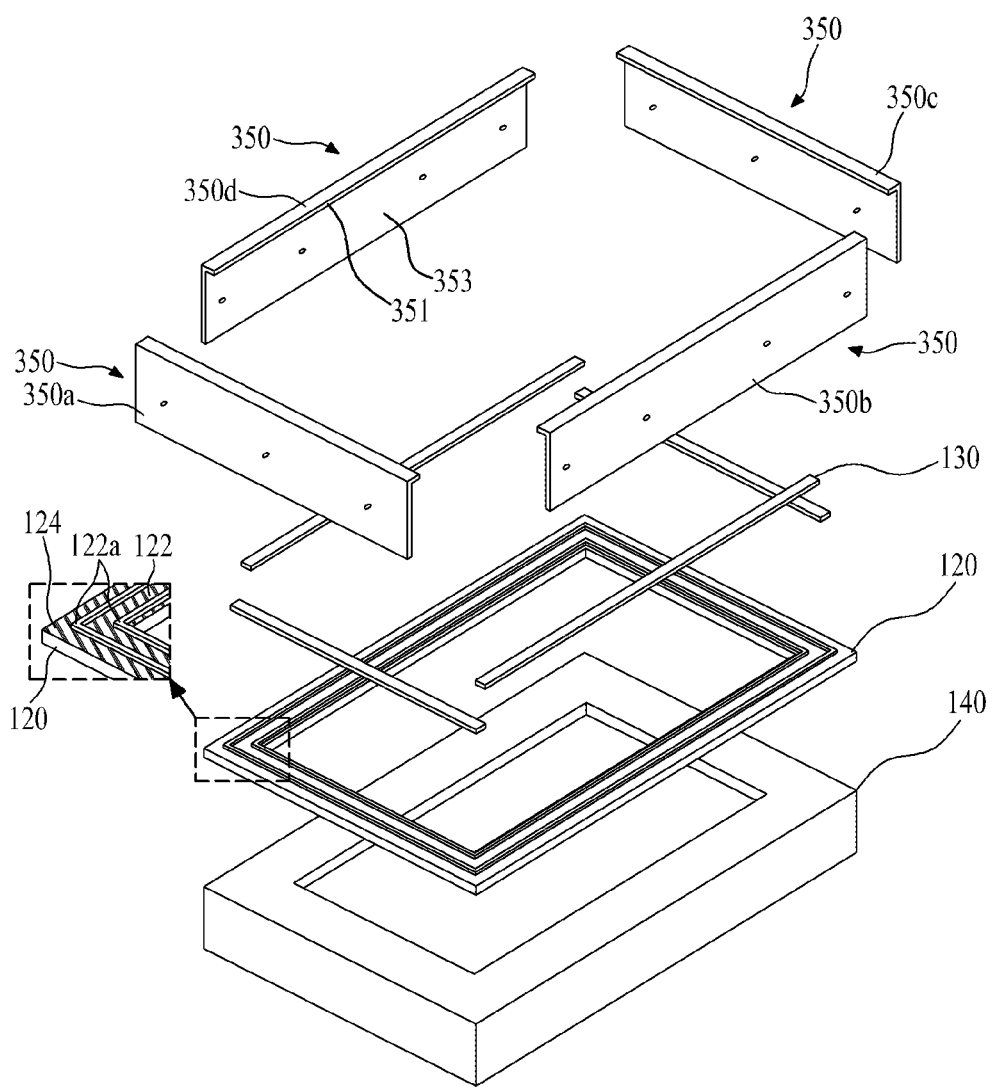
FIG. 14 is a view for describing an embodiment of a cover member of FIG. 13.

A cover member 350 according to an embodiment, as illustrated in FIG. 14, includes first to fourth cover brackets 350a to 350d that overlap with the respective cover overlapping parts 124 of the panel supporting member 120 that is disposed at respective edge portions of the short sides and long sides of the guide frame 140 and surround the side surface of the guide frame 340.

Each of the first to fourth cover brackets 350a to 350d includes a front portion 351, and a side portion 353.

The front portion 351 is formed in a "-"-shape to overlap with the cover overlapping part 124 of the panel supporting part 120. In this case, an upper gap UG (see FIG. 10) having a certain height is prepared between the front portion 351 and the cover overlapping portion 124 of the panel supporting member 120 coupled to the display panel 110. Herein, the upper gap UG may be less than about 1.5 mm. Therefore, the panel supporting member 120 coupled to the display panel 110 moves in at least one of Y-axis and Z-axis directions, inside the upper gap UG.

The side portion 353 is bent vertically from the front portion 351 and surrounds the side surface of the panel supporting member 120 and the side surface of the guide frame 340. The side portion 353 is fixed to the guide frame 340 by a screw 390 that is coupled to the vertical portion of the guide frame 340 through the side portion 353.

A height of the side portion 353 is formed higher than a height from the rear surface of the supporting cover 360 to a top of the cover overlapping part 124 of the panel supporting member 120 such that the upper gap UG is prepared between the cover overlapping part 124 of the panel supporting member 120 and the front portion 351. That is, the height (H2=H1+UG) of the side portion 353 is formed higher by the upper gap UG than an entire height H1 of the supporting cover 360 and panel supporting member 120. Furthermore, a side gap SG having a certain width (see FIG. 13) is prepared between a side surface of the side portion 353 and a side surface of the panel supporting member 120. Herein, the side gap SG may be less than about 1.5 mm. Therefore, the panel supporting member 120 coupled to the display panel 110 moves in an X-axis direction and/or a Z-axis direction, inside the side gap SG.

Figure 15:
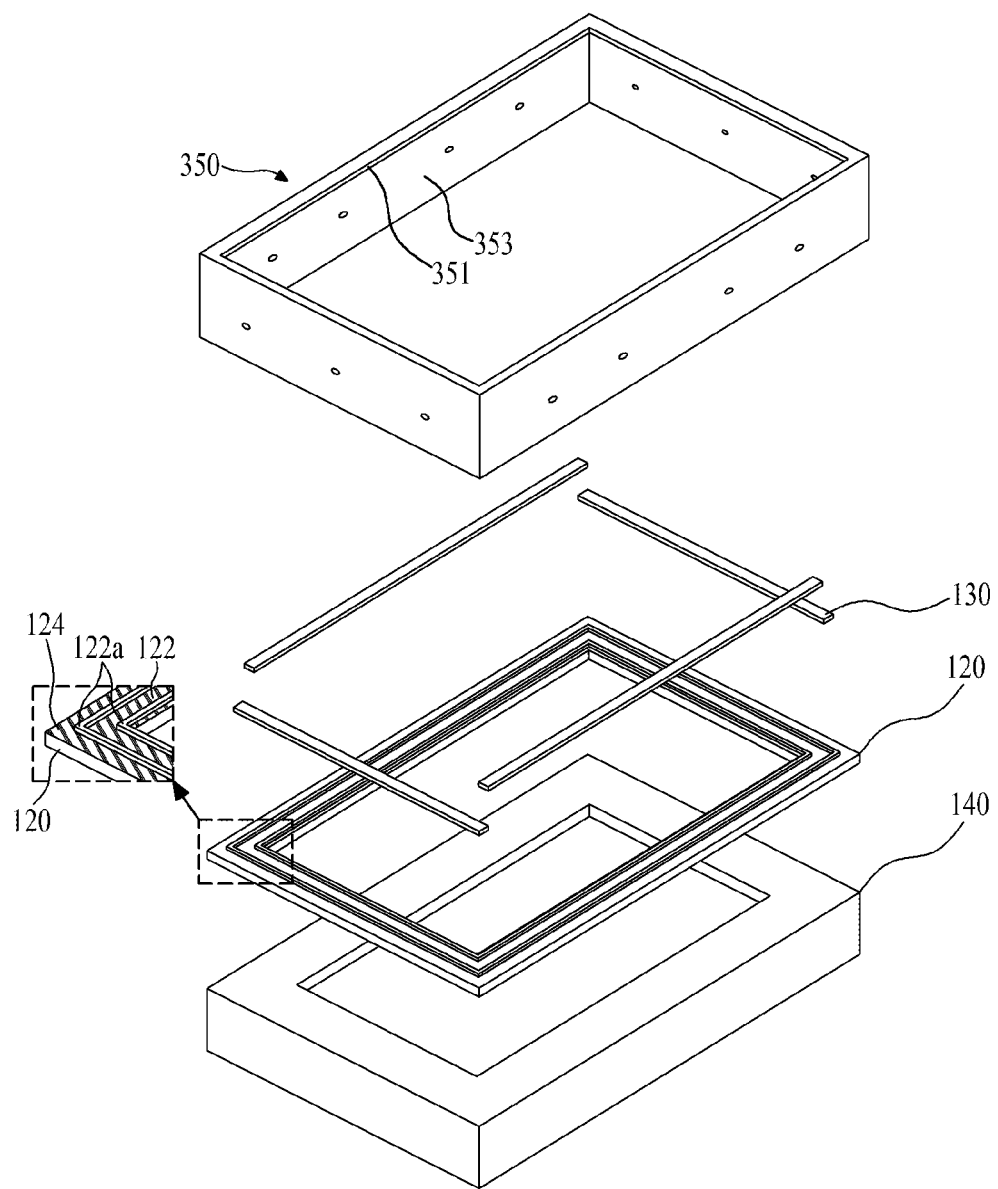
FIG. 15 is a view for describing another embodiment of the cover member of FIG. 13.

A cover member 350 according to another embodiment, as illustrated in FIG. 15, is formed to have a ㄱ-shaped sectional shape, and disposed to overlap with the cover overlapping parts 124 of the panel supporting member 120 that is disposed at respective edge portions of the short sides and long sides of the guide frame 340 and surround the side surface of the guide frame 340. That is, the cover member 350 according to another embodiment is the same as the cover member 350 according to an embodiment, except that the first to fourth cover brackets 350a to 350d configuring the cover member 350 according to an embodiment are integrated with each other to form a tetragonal frame shape.

The side portion 353 is fixed to the vertical portion of the guide frame 340 by the screw 390, and thus, the cover member 350 is disposed to surround the side surface of the panel supporting member 120 and the side surface of the guide frame 340 through the side portion 353 and surround the cover overlapping portion 124 of the panel supporting member 120 through the front portion 351. Therefore, the panel supporting member 120 coupled to the display panel 110 may move in at least one of X-axis, Y-axis, and Z-axis directions, inside the upper gap UG and the side gap SG that are respectively prepared by the front portion 351 and side portion 353 of the cover member 350.

As described above, the display apparatus 30 according to the third embodiment of the present invention can provide the same effects as those of the display apparatus 10 according to the first embodiment of the present invention.

Figure 16:
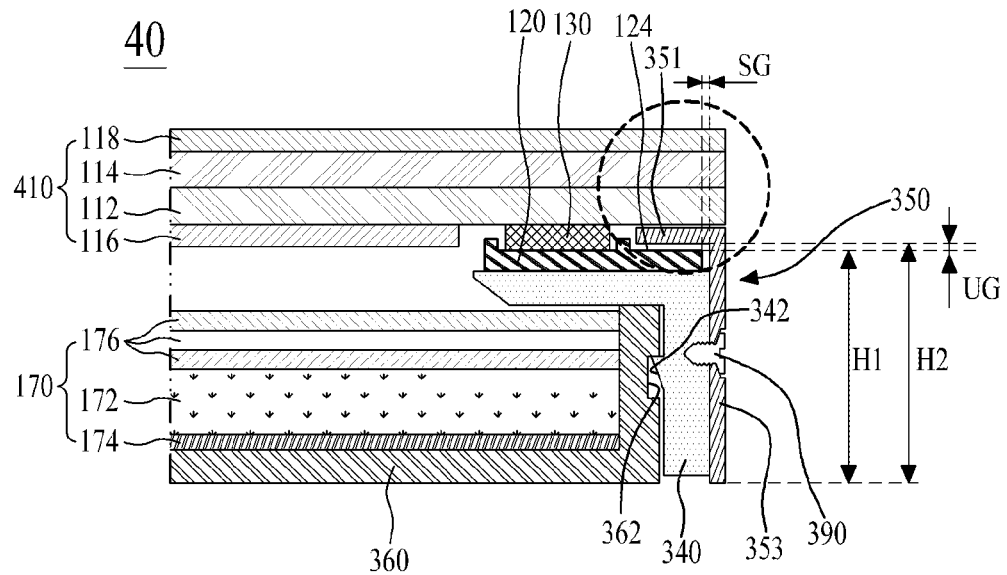
FIG. 16 is a view schematically illustrating a display apparatus according to a fourth embodiment of the present invention.

FIG. 16 is a view schematically illustrating a display apparatus according to a fourth embodiment of the present invention.

Referring to FIG. 16, a display apparatus 40 according to the fourth embodiment of the present invention includes a display panel 410, a panel supporting member 120 that supports a rear edge of the display panel 410, an adhesive member 130 that is formed at one side of the panel supporting member 120 and couples the display panel 410 and the panel supporting member 120, a guide frame 340 that supports the panel supporting member 120, a supporting cover 360 that supports the guide frame 340, and a cover member 350 that surrounds a top of the other side of the panel supporting member 120 and a side surface of the guide frame 340 so as to enable the movement of the panel supporting member 120. Except for the display panel 410, the display apparatus 40 having such a configuration includes the same elements as those of the display apparatus 30 according to the third embodiment of the present invention, and thus, the description of the display apparatus 30 is applied to the same elements.

The display panel 410, as illustrated in a circular dot line of FIG. 16, is configured identically to the display panel 110 of the display apparatus 30 according to the third embodiment of the present invention, except that the display panel 410 is formed to overlap with a front portion 351 of the cover member 350.

The front portion 351 of the cover member 350 is inserted into a space between a cover overlapping part 124 of the panel supporting member 120 and a lower substrate 112 of the display panel 410, and thus is not exposed to the outside.

In the display apparatus 40 according to the fourth embodiment of the present invention, the display panel 410 is formed to overlap with the front portion 351 of the cover member 350, and thus can configure a display product such as a television even without a separate element, for example, a set cover. However, in the display apparatus 30 according to the third embodiment of the present invention, since the front portion 351 of the cover member 350 is exposed to the outside, a separate element such as the set cover is required for configuring a display product. Therefore, the display apparatus 40 according to the fourth embodiment of the present invention may be used as a display module, for example, a liquid crystal display module, but the display apparatus 30 according to the third embodiment of the present invention may be used as a display module or a display product.

The display apparatus 40 according to the fourth embodiment of the present invention can provide the same effects as those of the display apparatus 30 according to the third embodiment of the present invention. Moreover, in the display apparatus 40 according to the fourth embodiment of the present invention, the display panel 410 is formed to overlap with the front portion 351 of the cover member 350, thus more enhancing a sense of beauty in design.

Figure 17:
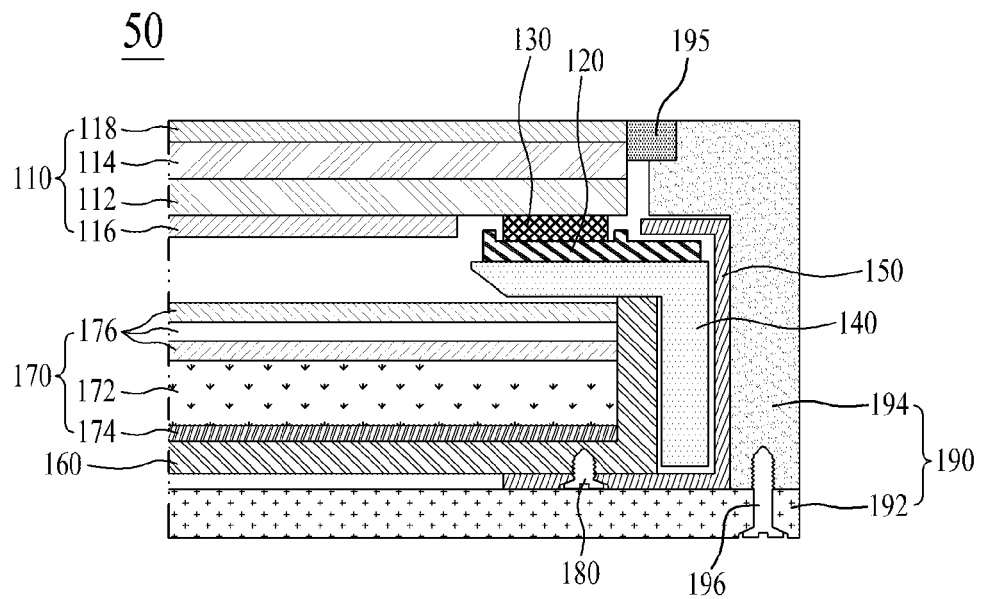
FIG. 17 is a view schematically illustrating a display apparatus according to a fifth embodiment of the present invention.

FIG. 17 is a view schematically illustrating a display apparatus according to a fifth embodiment of the present invention.

Referring to FIG. 17, a display apparatus 50 according to the fifth embodiment of the present invention includes a display panel 110, a panel supporting member 120 that supports a rear edge of the display panel 110, an adhesive member 130 that is formed at one side of the panel supporting member 120 and couples the display panel 110 and the panel supporting member 120, a guide frame 140 that supports the panel supporting member 120, a supporting cover 160 that supports the guide frame 140, a cover member 150 that surrounds a top of the other side of the panel supporting member 120 and a side surface of the guide frame 140 so as to enable the movement of the panel supporting member 120, and a set cover 190 that supports the supporting cover 160 and surrounds the cover member 150 and a side surface of the display panel 110 other than a front surface of the display panel 110. Except for the set cover 190, the display apparatus 50 having such a configuration includes the same elements as those of the display apparatus 10 according to the first embodiment of the present invention, and thus, the description of the display apparatus 10 is applied to the same elements.

The set cover 190 includes a set plate 192 and a set side wall 194.

The set plate 192 is formed in a flat type and supports the supporting cover 160 and the cover member 150. The set plate 192 acts as a rear cover of the produced display apparatus 50. That is, the set plate 192 may be used as a rear cover of a display product such as a television or a notebook computer.

The set side wall 194 surrounds the side surface of the display panel 110 other than the front surface of the display panel 110, and a front portion and side portion of the cover member 150. For this end, the set side wall 194 is formed to have a ㄱ-shape and disposed along an edge portion of the set plate 192. In this case, the set side wall 194 is coupled to the set plate 192 by a screw 196 that is coupled to the set side wall 194 through the set plate 192. The set side wall 194 configures a front border of the display panel 110, and acts as a side cover of the produced display apparatus 50. That is, the set plate 192 may be used as a side cover of a display product such as a television or a notebook computer.

In separately manufacturing the display panel 110 and the set cover 190, a gap space due to a process error is formed between the set side wall 194 and a side surface of the display panel 110 because the process error occurs in manufacturing. Due to this reason, foreign substances such as dust penetrate into the display apparatus 50 through the gap space. To prevent such a limitation, the display apparatus 50 according to the fifth embodiment of the present invention may further include a sealing member 195 that seals the gap space.

The sealing member 195 seals the gap space between the set side wall 194 and the side surface of the display panel 110, and thus prevents foreign substances such as dust from penetrating into the display apparatus 50 through the gap space. In this case, the sealing member 195 is formed to have the same color such that an aesthetic effect does not decrease due to a color difference between the set side wall 194 and the sealing member 195.

A sealing member 195 according to an embodiment is integrated with the set side wall 194 by a double injection process, and seals the gap space between the set side wall 194 and the side surface of the display panel 110.

A sealing member 195 according to another embodiment is formed in a ring shape or a pin shape, and inserted into the gap space between the set side wall 194 and the side surface of the display panel 110 to seal the gap space.

The display apparatus 50 according to the fifth embodiment of the present invention surrounds the side surface and rear surface of the display apparatus 10 according to the first embodiment of the present invention by using the set cover 190, and thus enables the practical use of a display product with a minimized thickness and an enhanced sense of beauty, for example, a television.

Figure 18:
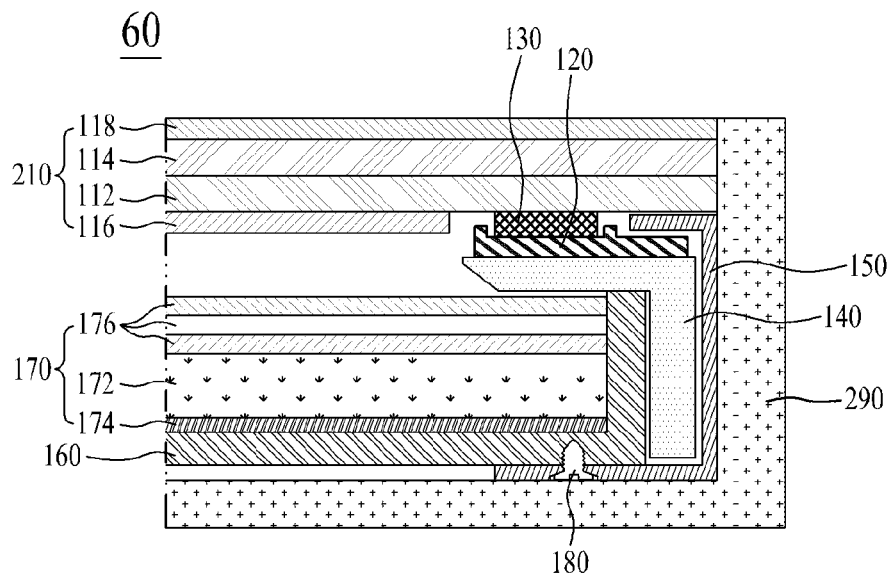
FIG. 18 is a view schematically illustrating a display apparatus according to a sixth embodiment of the present invention.

FIG. 18 is a view schematically illustrating a display apparatus according to a sixth embodiment of the present invention.

Referring to FIG. 18, a display apparatus 60 according to the sixth embodiment of the present invention includes a display panel 210, a panel supporting member 120 that supports a rear edge of the display panel 210, an adhesive member 130 that is formed at one side of the panel supporting member 120 and couples the display panel 210 and the panel supporting member 120, a guide frame 140 that supports the panel supporting member 120, a supporting cover 160 that supports the guide frame 140, a cover member 150 that surrounds a top of the other side of the panel supporting member 120 and a side surface of the guide frame 140 so as to enable the movement of the panel supporting member 120, and a set cover 290 that supports the supporting cover 160 and surrounds the cover member 150 and a side surface of the display panel 210 other than a front surface of the display panel 210. Except for the set cover 290, the display apparatus 60 having such a configuration includes the same elements as those of the display apparatus 20 according to the second embodiment of the present invention, and thus, the description of the display apparatus 20 is applied to the same elements.

The set cover 290 supports the supporting cover 160 and the cover member 150, and surrounds a side portion of the cover member 150 and a side surface of the display panel 210 other than a front surface of the display panel 210. For this end, the set cover 290 is formed in a U-shape to include a set plate and a set side wall bent from the set plate. In this case, the set cover 290 may be coupled to the cover member 150 through the set side wall, or coupled to the cover member 150 or the supporting cover 160 by a screw (not shown) that is coupled to the supporting cover 160 through the set plate. The set cover 290 configures a front border of the display panel 210 through the set side wall, and acts as a rear cover and side cover of the produced display apparatus 60. That is, the set cover 290 may be used as a product cover that is externally exposed to surround portions other than the front surface of the display panel 210 of a display product such as a television or a notebook computer.

The display apparatus 60 according to the sixth embodiment of the present invention may further include a sealing member (not shown) that seals a gap space between the side surface of the display panel 210 and the set side wall of the set cover 290. The sealing member is formed to be integrated with the set side wall by a double injection process, or formed in a ring shape or a pin shape to seal the gap space.

The display apparatus 60 according to the sixth embodiment of the present invention surrounds the side surface and rear surface of the display apparatus 20 according to the second embodiment of the present invention by using the set cover 290, and thus enables the practical use of a display product with a minimized thickness and an enhanced sense of beauty, for example, a television.

Figure 19:
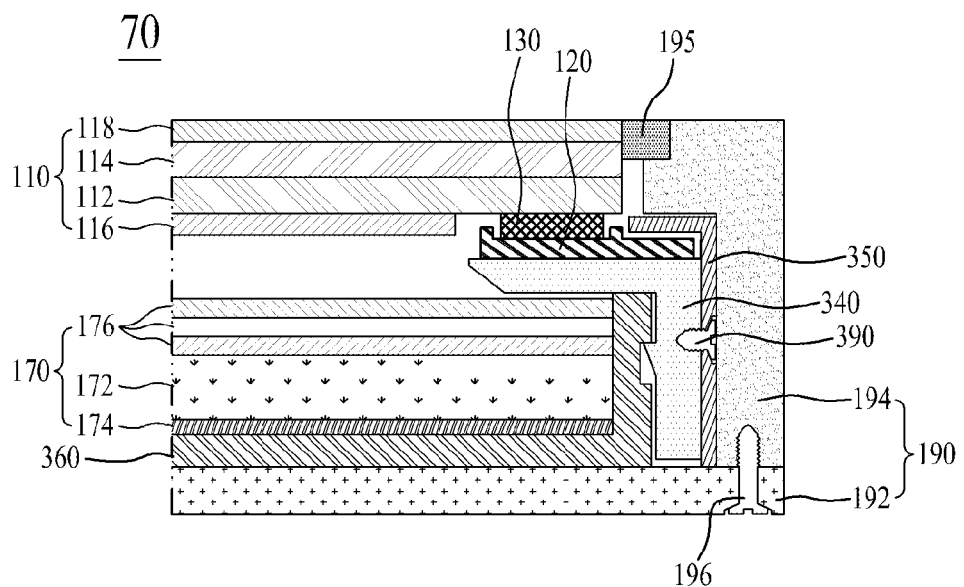
FIG. 19 is a view schematically illustrating a display apparatus according to a seventh embodiment of the present invention.

FIG. 19 is a view schematically illustrating a display apparatus according to a seventh embodiment of the present invention.

Referring to FIG. 19, a display apparatus 70 according to the seventh embodiment of the present invention includes a display panel 110, a panel supporting member 120 that supports a rear edge of the display panel 110, an adhesive member 130 that is formed at one side of the panel supporting member 120 and couples the display panel 110 and the panel supporting member 120, a guide frame 340 that supports the panel supporting member 120, a supporting cover 360 that supports the guide frame 340, a cover member 350 that surrounds a top of the other side of the panel supporting member 120 and a side surface of the guide frame 340 so as to enable the movement of the panel supporting member 120, and a set cover 190 that supports the supporting cover 360 and surrounds the cover member 350 and a side surface of the display panel 110 other than a front surface of the display panel 110. The display apparatus 70 having such a configuration is configured to surround the side surface and rear surface of the display apparatus 30 according to the third embodiment of the present invention by using set cover 190 of the display apparatus 50 according to the fifth embodiment of the present invention, and thus, the description of the display apparatus 50 is applied to the display apparatus 70.

Accordingly, the display apparatus 70 according to the seventh embodiment of the present invention surrounds the side surface and rear surface of the display apparatus 30 according to the third embodiment of the present invention by using the set cover 190, and thus enables the practical use of a display product with a minimized thickness and an enhanced sense of beauty, for example, a television.

Figure 20:
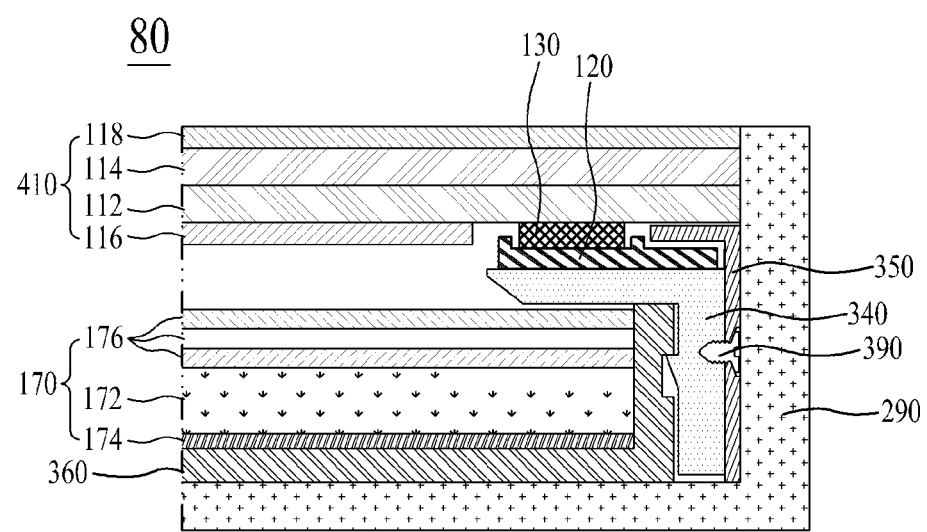
FIG. 20 is a view schematically illustrating a display apparatus according to an eighth embodiment of the present invention.

FIG. 20 is a view schematically illustrating a display apparatus according to an eighth embodiment of the present invention.

Referring to FIG. 20, a display apparatus 80 according to the eighth embodiment of the present invention includes a display panel 410, a panel supporting member 120 that supports a rear edge of the display panel 410, an adhesive member 130 that is formed at one side of the panel supporting member 120 and couples the display panel 410 and the panel supporting member 120, a guide frame 340 that supports the panel supporting member 120, a supporting cover 360 that supports the guide frame 340, a cover member 350 that surrounds a top of the other side of the panel supporting member 120 and a side surface of the guide frame 340 so as to enable the movement of the panel supporting member 120, and a set cover 290 that supports the supporting cover 360 and surrounds the cover member 350 and a side surface of the display panel 410 other than a front surface of the display panel 410.

The display apparatus 80 having such a configuration is configured to surround the side surface and rear surface of the display apparatus 40 according to the fourth embodiment of the present invention by using set cover 290 of the display apparatus 60 according to the sixth embodiment of the present invention, and thus, the description of the display apparatus 60 is applied to the display apparatus 80.

Accordingly, the display apparatus 80 according to the eighth embodiment of the present invention surrounds the side surface and rear surface of the display apparatus 40 according to the fourth embodiment of the present invention by using the set cover 290, and thus enables the practical use of a display product with a minimized thickness and an enhanced sense of beauty, for example, a television.

As described above, in the display apparatus according to embodiments of the present invention, the display panel is coupled to the panel supporting member by the adhesive member, the panel supporting member coupled to the display panel is disposed at the guide frame, and then the cover member movably surrounds the panel supporting member coupled to the display panel.

According to the embodiments of the present invention, by removing the existing upper case, the thickness of the display apparatus can be minimized.

Moreover, the entire front surface of the display panel is exposed to the outside, thus enhancing a sense of beauty in design.

Moreover, the panel supporting member coupled to the display panel moves, thus preventing light leakage due to the non-movement of the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
a display panel;
a panel supporting member supporting a rear edge of the display panel;
an adhesive member disposed at a first portion of a top side of the panel supporting member, and coupling the display panel and the panel supporting member;
a guide frame movably supporting the panel supporting member coupled to the display panel by the adhesive member; and
a cover member disposed to overlap with a second portion of the top side of the panel supporting member and surround a side surface of the guide frame,
wherein the cover member comprises:
a front portion overlapping with the second portion of the top side of the panel supporting member; and
a side portion bent from the front portion, and surrounding a side surface of the panel supporting member and the side surface of the guide frame.

2. The display apparatus of claim 1, wherein a top and side surface of the display panel are exposed to the outside without being surrounded by the guide frame and the cover member.

3. The display apparatus of claim 1, wherein the panel supporting member is movable in a Z-axis direction by an upper gap having a certain height which is prepared between the second portion of the top side of the panel supporting member and the front portion of the cover member, and is movable in at least one of X-axis and Y-axis directions by a side gap having a certain width which is prepared between the side surface of the panel supporting member and the side portion of the cover member.

4. The display apparatus of claim 3, wherein the cover member is formed in a tetragonal frame shape to have a ㄱ-shaped sectional surface by the front portion and the side portion.

5. The display apparatus of claim 4, further comprising a coupling member coupled to the guide frame through the side portion of the cover member to fix the cover member.

6. The display apparatus of claim 3, further comprising:
a supporting cover supporting the guide panel; and
a coupling member coupling the cover member to the supporting cover.

7. The display apparatus of claim 6, further comprising a backlight unit placed in the supporting cover, and irradiating light on the display panel.

8. The display apparatus of claim 6, wherein,
the cover member further comprises a rear portion which is bent from the side portion to face a rear surface of the supporting cover, and
the coupling member is coupled to the supporting cover through the rear portion to fix the cover member.

9. The display apparatus of claim 6, further comprising a set cover supporting the supporting cover, and surrounding the side portion of the cover member and a side surface of the display panel other than a front surface of the display panel.

10. The display apparatus of claim 9, wherein the set cover comprises:
a set plate supporting the supporting cover; and
a set side wall disposed at an edge of the set plate and formed in a ㄱ-shape to surround the front portion and side portion of the cover member and the side surface of the display panel other than the front surface of the display panel.

11. The display apparatus of claim 10, further comprising a gap sealing member integrated with the set side wall to seal a gap space between the side surface of the display panel and the set side wall, or inserted into a gap space between the side surface of the display panel and the set side wall to seal the gap space.

12. The display apparatus of claim 6, wherein,
the display panel is disposed to overlap with the front portion of the cover member, and
the front portion of the cover member is inserted into a space between the panel supporting member and the display panel, for the upper gap to be prepared therein.

13. The display apparatus of claim 12, further comprising a set cover supporting the supporting cover, and surrounding the side portion of the cover member and a side surface of the display panel other than a front surface of the display panel.

14. The display apparatus of claim 1, wherein the panel supporting member is formed in a tetragonal frame shape to comprise an adhesive member forming part with the adhesive member formed therein and a cover overlapping part overlapping with the cover member.

15. The display apparatus of claim 14, wherein the panel supporting member further comprises a plurality of slits which are disposed at certain intervals at the adhesive member forming part with the adhesive member formed therein.

16. The display apparatus of claim 1, wherein the panel supporting member comprises first to fourth supporting brackets which are formed to comprise an adhesive member forming part with the adhesive member formed therein and a cover overlapping part overlapping with the cover member, coupled to respective edge portions of long sides and short sides of the display panel by the adhesive member, and supported by the guide frame.

17. The display apparatus of claim 16, wherein the panel supporting member further comprises a plurality of slits which are formed at certain intervals at the adhesive member forming part of each of the first to fourth supporting brackets, the adhesive member being formed at the adhesive member forming part.

18. The display apparatus of claim 1, wherein the panel supporting member comprises first to fourth supporting brackets which are formed to comprise an adhesive member forming part with the adhesive member formed therein and a cover overlapping part overlapping with the cover member, coupled to respective rear edge portions of the display panel at certain intervals by the adhesive member, and supported by the guide frame.

19. The display apparatus of claim 18, further comprising a plurality of pads disposed at the guide frame in correspondence with respective gaps between the supporting brackets to seal the respective gaps between the supporting brackets.

20. The display apparatus of claim 18, wherein each of the supporting brackets further comprises:
a pair of adhesive member guide members disposed in parallel to each other with the adhesive member forming part therebetween; and
a corner cutting part disposed at both side end portions of each of the pair of adhesive member guide members.

21. The display apparatus of claim 20, wherein each of the supporting brackets further comprises a pad member which is formed of a soft material at the corner cutting part.

22. The display apparatus of claim 18, wherein each of the supporting brackets further comprises a pair of adhesive member guide members which is formed of a soft material, and disposed in parallel to each other with the adhesive member forming part therebetween.

* * * * *